(12) United States Patent
Windisch et al.

(10) Patent No.: US 7,787,360 B2
(45) Date of Patent: Aug. 31, 2010

(54) SYSTEM AND METHOD FOR PRESERVING MULTICAST DATA FORWARDING DURING CONTROL FAILURES IN A ROUTER

(75) Inventors: Kurt J. Windisch, Florence, OR (US); WeeSan Lee, Arcadia, CA (US); Isidoros Kouvelas, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 1122 days.

(21) Appl. No.: 10/897,959

(22) Filed: Jul. 23, 2004

(65) Prior Publication Data

US 2006/0018253 A1 Jan. 26, 2006

(51) Int. Cl.
*G01R 31/08* (2006.01)
(52) U.S. Cl. .................................. 370/217
(58) Field of Classification Search ......... 370/216–220, 370/225–228, 312, 270, 390, 432, 473, 254–255
See application file for complete search history.

(56) References Cited

U.S. PATENT DOCUMENTS

| 5,519,704 | A | 5/1996 | Farinacci et al. | |
|---|---|---|---|---|
| 6,052,373 | A | 4/2000 | Lau | |
| 6,553,028 | B1 | 4/2003 | Tang et al. | |
| 6,704,278 | B1 | 3/2004 | Albert et al. | |
| 6,735,169 | B1 | 5/2004 | Albert et al. | |
| 6,735,201 | B1 | 5/2004 | Mahajan et al. | |
| 6,917,983 | B1 * | 7/2005 | Li | 709/238 |
| 7,130,926 | B1 * | 10/2006 | Wu et al. | 709/250 |
| 7,444,422 | B1 * | 10/2008 | Li | 709/238 |
| 2002/0171886 | A1 | 11/2002 | Wu et al. | |
| 2003/0135644 | A1 * | 7/2003 | Barrett | 709/238 |
| 2005/0198083 | A1 * | 9/2005 | Saika et al. | 707/204 |

OTHER PUBLICATIONS

Hadriel Kaplan, NSR Non-Stop Routing Technology, 2002, Avici Systems, Part 3 in the Reliability Series.*
Charles Goldberg, Making sure net routing doesn't fail, Nov. 18 2002, Network World.*
David Ward, Routing/Signalling Non-Stop Forwarding and Increased Network and Node Availability, Feb. 2002, Cisco Systems.*
U.S. Appl. No. 10/376,006, Kouvelas et al.
N. Bhaskar et al., "Bootstrap Router (BSR) Mechanism for PIM," draft-ietf-pim-sm-bsr-04.txt, Internet Engineering Task Force (IETF), http://www.ietf.org, Jul. 18, 2004 pp. 1-37.
B. Fenner et al., "Protocol Independent Multicast—Sparse Mode (PIM-SM) :Protocol Specification (Revised)," draft-ietf-pim-sm-v2-new-09.txt IETF, http://www.ieft.org, Feb. 16, 2004 pp. 1-147.

(Continued)

*Primary Examiner*—Kwang B Yao
*Assistant Examiner*—Tung Q Tran
(74) *Attorney, Agent, or Firm*—Cesari and McKenna, LLP

(57) ABSTRACT

A multicast non-stop forwarding (NSF) router architecture enhances high availability of a multicast router in a computer network. The router architecture further preserves multicast data forwarding through a data plane during NSF recovery of one or more failures in a control plane of the router. Various multicast components of the router cooperate to provide a checkpointing and recovery technique of the multicast NSF architecture that enables efficient restart and recovery of the control plane failures without loss of data connectivity.

26 Claims, 8 Drawing Sheets

OTHER PUBLICATIONS

B. Cain et al., "Internet Group Management Protocol, Version 3," Request for Comments (RFC) 3376, IETF, http://www.ieft.org, Oct. 2002, pp. 1-53.

Rekhter et al., "A Border Gateway Protocol 4 (BGP-4)," RFC 1771, IETF, http://www.ieft.org, Mar. 1995, pp. 1-57.

T. Bates et al., "Multiprotocol Extensions for BGP-4," RFC 2858, IETF, http://www.ieft.org, Jun. 2000, pp. 1-11.

J. Reynolds et al., "Assigned Numbers," RFC 1700, IETF, http://www.ietf.org, Oct. 1994, pp. 1-230.

U.S. Appl. No. 10/897,611, Kurt J. Windisch et al.

"Notification of Trnasmittal of the International Search Report and the Written Opinion of the International Seaching Authority, or the Declaration" for International Application No. PCT/US05/25704 with an International Filing Date of Jul. 20, 2005.

* cited by examiner

SYSTEM AND METHOD FOR PRESERVING MULTICAST DATA FORWARDING DURING CONTROL FAILURES IN A ROUTER

CROSS-REFERENCE TO RELATED APPLICATION

The present invention is related to the following commonly assigned U.S. patent application Ser. No. 10/897,611 titled, Multiple Multicast Forwarder Prevention during NSF Recovery of Control Failures in a Router, filed herewith, which application is hereby incorporated by reference as though fully set forth herein.

FIELD OF THE INVENTION

This invention relates generally to computer networks, and more particularly, to multicast routing protocols executed by a non-stop forwarding intermediate node of a computer network.

BACKGROUND OF THE INVENTION

Data communication in a computer network involves the exchange of data between two or more entities interconnected by communication links, segments and sub-networks. These entities are typically software processes executing on hardware computer platforms, such as end nodes and intermediate nodes. Communication software executing on the end nodes correlate and manage data communication with other end nodes. The nodes typically communicate by exchanging discrete frames or packets of data according to predefined protocols, such as the Transmission Control Protocol/Internet Protocol (TCP/IP).

An intermediate node, such as a router, may interconnect the subnetworks to extend the effective "size" of the computer network. The router executes routing protocols used to direct the transmission of data traffic between the end nodes, such as hosts. Typically, the router directs network traffic based on destination address prefixes contained in the packets, i.e., the portions of destination addresses used by the routing protocol to render routing ("next hop") decisions. Examples of such destination addresses include Internet Protocol (IP) version 4 (IPv4) and version 6 (IPv6) addresses. A prefix implies a combination of an IP address and a mask that cooperate to describe an area or range of the network that a router can reach.

Unicast data transfer involves forwarding a data packet from a single sending process of an end node ("source") to a single receiving process of an end node ("receiver") on the computer network. Often the destination of the data packet issued by a source may be more than one, but less than all of the receivers on the network. This type of multicast data transfer is typically employed to segregate communication between groups of receivers on the network. IP multicasting, in particular, may be used to disseminate data to a large group of receivers on the network.

To affect IP multicasting, the source generally specifies a destination IP address that is a multicast group address for the message and, as such, can only represent receivers of packets. The IPv4 (or IPv6) address range is subdivided into different prefixes, one of which is designated for use by IP multicast. Receivers typically notify their communication software of their desire to receive messages destined for the multicast group address; this is called "joining a multicast group". These receiving members then "listen" on the multicast address and, when a multicast message is received at a receiver, it delivers a copy of the message to each process that belongs to the group.

IP multicasting relies on (i) a group management protocol to establish and maintain local multicast group membership, and (ii) multicast routing protocols to route packets efficiently. The Internet Group Membership Protocol (IGMP) manages packet communication between hosts and their local multicast router, letting them join or leave groups. That is, IGMP is used to send a group membership message from a host to its directly connected ("last-hop") router, indicating that the host wants to join a group (address) as a receiver. Note that IGMP is an IPv4 group membership protocol; the conventional Multicast Listener Discovery (MLD) protocol is substantially similar to, and performs the same functions as, IGMP, but for IPv6. When group membership is established, multicast packets (identified by a multicast group address in the destination address field of an IP header) are forwarded between routers using multicast routing protocols.

Multicast routing protocols construct distribution trees through the network and direct multicast forwarding. The multicast distribution trees define the path that multicast traffic will take through the network to group members. These paths are based on source or shared multicast distribution trees. A multicast distribution tree is shared when any source (host) originating data traffic destined to a group address of a multicast group uses the same distribution tree to forward data to the receivers. In contrast, a source distribution tree is a separate, shortest path tree (SPT) built for each source originating traffic to the multicast group.

A rendezvous point is a specific router that is designated as the root of a shared multicast distribution tree. Each router in the network knows the identity of the rendezvous point for each multicast group because shared multicast distribution trees are rooted at the rendezvous points. An announcement protocol is typically used to select and announce rendezvous points to all routers in the network. However, an alternative to using an announcement protocol to automatically advertise rendezvous points to all routers in the network is to manually configure the identity of the rendezvous points on all of the routers. Examples of an announcement protocol include the Auto-RP multicast protocol available from Cisco Systems Inc. and the Bootstrap Router (BSR) described in *Bootstrap Router (BSR) Mechanism for PIM Sparse Mode*, Internet Engineering Task Force Internet-Draft, draft-ietf-pim-sm-bsr-03.txt, by Fenner, et al. February 2003. Examples of multicast routing protocols that use a rendezvous point include Protocol Independent Multicast-Sparse Mode (PIM-SM) and Bidirectional PIM (BIDIR-PIM) protocols. Other multicast protocols that do not require a rendezvous point include PIM dense mode (PIM-DM) and PIM source specific multicast (PIM-SSM) protocols.

IP multicast may be deployed on a computer network using a specific rendezvous point to build a shared multicast distribution tree for a specific group falling within a destination address prefix. Any group falling within a different prefix uses a different rendezvous point, i.e., a different group range-to-rendezvous point address mapping. A router joins a multicast group (distribution tree) towards the rendezvous point. The host (receiver) is a leaf or node on the distribution tree. Packets are sent from a source to the root of the distribution tree, where they are forwarded towards the branches and out to the nodes that represent the receivers. On each node, packets are received on the interface towards the root of the tree and packets are forwarded out other interfaces towards the receivers or nodes.

Specifically, a receiver uses IGMP to communicate a request to join a multicast group address to a last-hop router. The router communicates that request to its neighboring routers (neighbors) on the link towards the rendezvous point using a multicast routing protocol, such as PIM. Auto-RP or BSR is used to distribute group range-to-rendezvous point address mapping configuration to all PIM-enabled routers that participate in the network topology. Collectively the routers construct a shared multicast distribution tree rooted at the rendezvous point for that group address and having a branch that "pulls" data traffic towards the last-hop router.

The infrastructure of a router typically comprises functional components organized as a control plane and a data plane. The control plane includes the functional components needed to manage the traffic forwarding features of the router. These components include routing protocols, configuration information and other similar functions that determine the destinations of data packets based on information other than that contained within the packets. The data plane, on the other hand, includes functional components needed to perform forwarding operations for the packets.

For a single processor router, the control and data planes are typically implemented on the single processor. However, for some high performance routers, these planes are implemented within separate devices of the intermediate node. For example, the control plane may be implemented in a supervisor processor, whereas the data plane may be implemented within a hardware-assist device, such as a co-processor or a forwarding processor. In other words, the data plane is typically implemented in hardware that is separate from the hardware that implements the control plane.

The control plane generally tends to be more complex than the data plane in terms of the quality and quantity of software operating on the supervisor processor. Therefore, failures are more likely to occur in the supervisor processor when executing such complicated code. In order to ensure high availability in a router, it is desirable to configure the router such that if a failure arises with the control plane that requires restarting of software executing on the supervisor processor, the data plane continues to operate correctly. Restarting of control plane software may be necessary because of a failure with a routing protocol component or a software upgrade to that component. A router that is configured to enable its data plane to continue packet forwarding operations during restart of the control plane software is referred to as a non-stop forwarding (NSF) capable router.

Situations where a NSF capable router architecture is useful include both anticipated and non-anticipated failures in the control plane of the router. For example, failures in the control plane can include unanticipated or unplanned events (e.g., software crashes or hardware errors) as well as planned or anticipated events (e.g., scheduled maintenance). As for latter, assume it is desired to upgrade software running on the supervisor processor or even remove and replace that processor for service. Such an upgrade or removal/replacement may cause an interruption in one or more routing protocols, but the NSF nature of the router allows continued forwarding of data through the router.

NSF router architectures have been implemented in unicast forwarding applications to enhance router availability and avoid disruption of data connectivity. These previous implementations often require modification of unicast routing protocols to add support to NSF. For example, modifications to a known unicast routing protocol allow support for graceful restart of router protocol failures. When the router is restarted, the modified protocol allows the router to obtain information (via protocol message exchanges) with its neighbors and without the neighbors "viewing" the router as being completely down, thereby obviating any changes to the routing topology. The present invention is directed, in part, to implementing a multicast NSF router architecture without modifying existing multicast protocol definitions.

Failures or outages of hardware or software controlling a multicast router (i.e., components in the control plane, not in the path of data packets through the router) can cause multicast data packets transiting the router to be dropped without recourse. The result is loss of multicast connectivity in the network and decreased availability of the impacted router. The present invention is further directed to solving the loss of multicast data connectivity and decreased availability during control failures in a multicast router.

SUMMARY OF THE INVENTION

The present invention overcomes the disadvantages of the prior art by providing a multicast non-stop forwarding (NSF) router architecture that enhances high availability of a multicast router in a computer network. The router architecture further preserves multicast data forwarding through a data plane during NSF recovery of one or more failures in a control plane of the router. As described herein, various multicast components of the router cooperate to provide a checkpointing and recovery technique of the multicast NSF architecture that enables efficient restart and recovery of the control plane failures without loss of data connectivity. These multicast components illustratively include a protocol-independent multicast (PIM) multicast routing protocol and a multicast routing information base (MRIB) in the control plane, as well as a multicast forwarding information base (MFIB) in the data plane.

Recovery in the multicast NSF router involves efficient restarting of a failed multicast component, such as PIM, and rebuilding of state based on conventional PIM protocol messages until all necessary information has been recovered. In this context, rebuilding of state denotes reestablishing communication between the recovering PIM routing protocol and its peer routing protocols executing in neighboring routers (neighbors), and exchanging multicast control messages among those protocols to enable reconstruction of a PIM topology table. To that end, the novel multicast NSF technique monitors and persistently stores, i.e., checkpoints, selective information during proper operation of the router so that the information can be subsequently retrieved and used to rebuild the contents or state of the PIM topology table during NSF recovery. According to an aspect of the inventive technique, the selective information checkpointed by PIM includes (i) group range-to-rendezvous point address mappings, (ii) data-driven events, and (iii) reverse path forwarding (RPF) information.

According to another aspect of the inventive technique, NSF recovery comprises a plurality of phases having an associated timing sequence that efficiently restarts the router and its constituent multicast components after a control plane failure in order to obviate packet loss. Broadly stated, the MFIB enters NSF mode during a MFIB freeze phase that "freezes" the contents of its forwarding table in response to a control plane failure, e.g., a failure to PIM, and subsequent communication disconnection between MFIB and PIM. Freezing of the MFIB preserves "stale" routes in the data plane, thereby ensuring continued multicast data flow through the router for pre-existing routes. The failed control plane component (e.g., PIM) then restarts in NSF mode within a defined period of time during a process restart phase. In a checkpointed data recovery phase, PIM replays a first portion of the checkpointed information (e.g., group range-to-rendezvous point address mapping and RPF information) before entering a protocol adjacency reestablishment phase, where PIM establishes control traffic communication (e.g., PIM hello adjacencies) with its peer routing protocols. The checkpointed data recovery phase is then reentered to replay the remaining portion of the information (e.g., data-driven events). In a MFIB refresh phase, the connection between MFIB and PIM (via MRIB) is reestablished and the contents of the MFIB forwarding table are updated. Thereafter, a NSF completion phase is entered wherein MFIB (and PIM) transition to normal mode, thereby completing NSF recovery.

Advantageously, the present invention obviates the need to modify conventional multicast routing protocols and may be implemented on any subset of routers in a network. That is, the novel NSF checkpointing and recovery technique ensures that state can be rebuilt in the multicast routing protocol topology table before neighbors detect a fatal problem and time out multicast adjacency and route state, thereby leading to loss of multicast connectivity. In addition, multicast forwarding state is not modified or removed until routing protocols of the router are fully recovered and resynchronized with the neighbors. The present invention is distinguished from previous NSF solutions because it protects multicast data transfers, rather than unicast data transfers by coordinating recovery among various multicast components.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
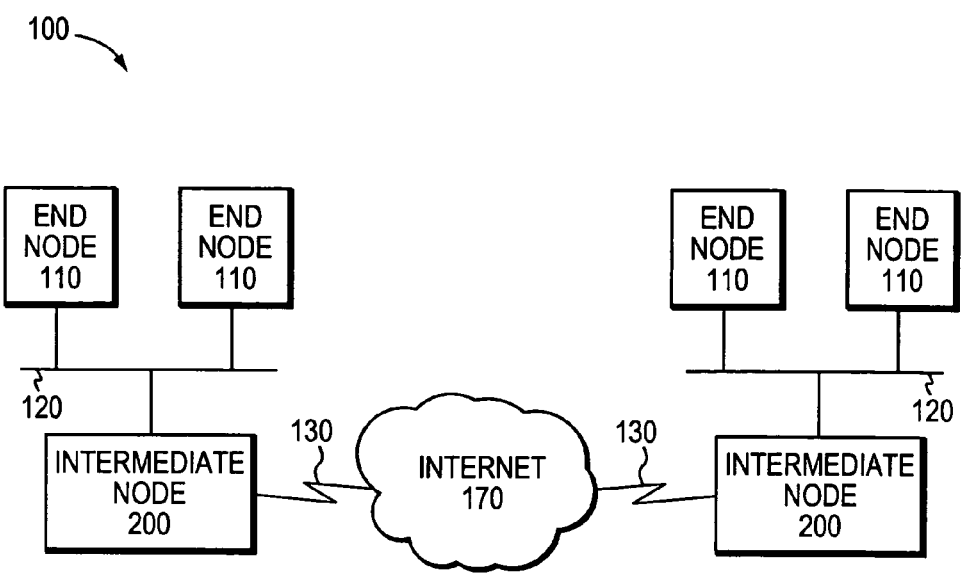
FIG. 1 is a schematic block diagram of a computer network that can be advantageously used with the present invention.

FIG. 1 is a schematic block diagram of a computer network 100 that can be advantageously used with the present invention. The computer network 100 comprises a collection of communication links, segments and subnetworks connected to a plurality of nodes, such as end nodes 110 and intermediate network nodes 200. The links, segments and subnetworks may comprise local area networks (LANs) 120, wide area networks (WANs) such as Internet 170 and WAN links 130 interconnected by intermediate nodes 200, such as network switches or routers, to form a network of computer nodes. The nodes communicate by exchanging data packets according to a predefined set of protocols, such as the Transmission Control Protocol/Internet Protocol (TCP/IP).

Figure 2:
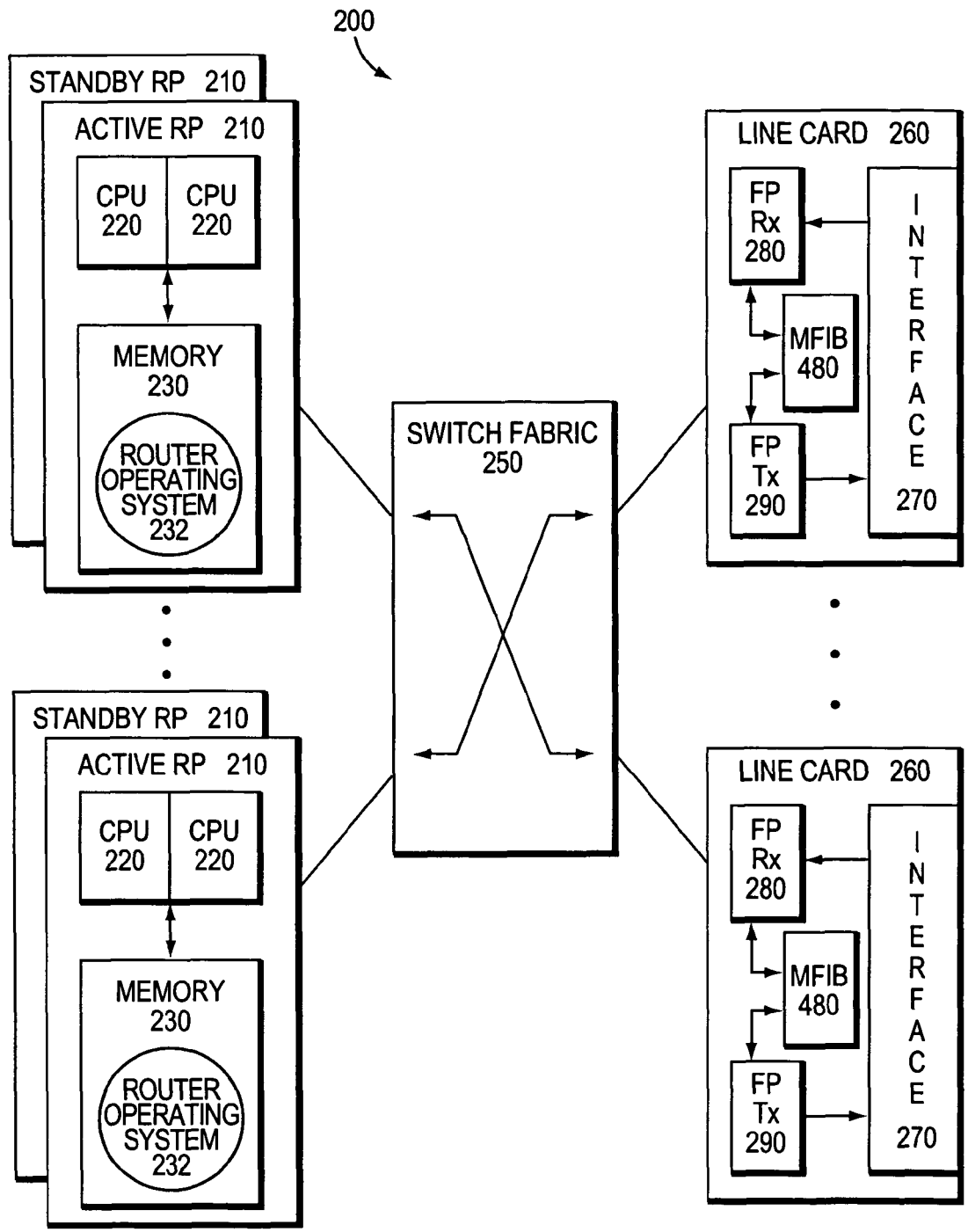
FIG. 2 is a schematic block diagram of an embodiment of a router that may be advantageously used with the present invention.

FIG. 2 is a schematic block diagram of a router, such as multicast router 200, which may be advantageously used with the present invention. The router 200 comprises a plurality of loosely coupled processors 210 connected to a plurality of ingress and egress line cards (line cards 260) via an interconnect 250 such as, e.g., a crossbar interconnection or high-speed bus. Those skilled in the art will recognize that other router platforms such as, e.g., a uniprocessor system or a plurality of independent nodes interconnected via a communications fabric as a multi-node cluster, could be used in accordance with the invention. In this context, the term "node" denotes a computer or processor complex comprising processors and an independent memory shared by the processors.

The processors 210 are illustratively route processors (RP) configured as active and standby RP pairs, with each processor having a dedicated memory 230. The memory 230 may comprise storage locations addressable by the processor for storing software programs and data structures associated with the invention. The processor 210 may comprise processing elements or logic for executing the software programs and manipulating the data structures. A router operating system 232, portions of which are typically resident in memory 230 and executed by the processor, functionally organizes the router by, inter alia, invoking network operations in support of software processes (described herein) executing on the processor. It will be apparent to those skilled in the art that other processor and memory means, including various computer readable media, may be used for storing and executing program instructions pertaining to the inventive architecture described herein.

In the illustrative embodiment, the line cards perform forwarding of the data traffic, while the route processors handle routing and control of the data traffic forwarding. Each route processor comprises two central processing units (CPUs 220), e.g., Power-PC 7460 chips, configured as a symmetric multiprocessing (SMP) pair. The CPU SMP pair is adapted to run a single copy of the router operating system 232 and access its memory space 230. Each line card 260 comprises an interface 270 having a plurality of ports coupled to a receive forwarding processor (FP Rx 280) and a transmit forwarding processor (FP Tx 290). The FP Rx 280 renders a forwarding decision for each packet received at the router on an ingress interface of an ingress line card in order to determine where to forward the packet. To that end, the FP Rx makes use of a multicast forwarding information base (MFIB) 480, described further herein. In the event that the packet is to be forwarded to one of the router's route processors, the FP Rx makes use of an internal FIB, IFIB, to determine to which route processor the packet should be forwarded. Likewise, the FP Tx 290 performs lookup operations (using MFIB 480) on a packet transmitted from the router via one or more egress interfaces of an egress line card.

Figure 3:
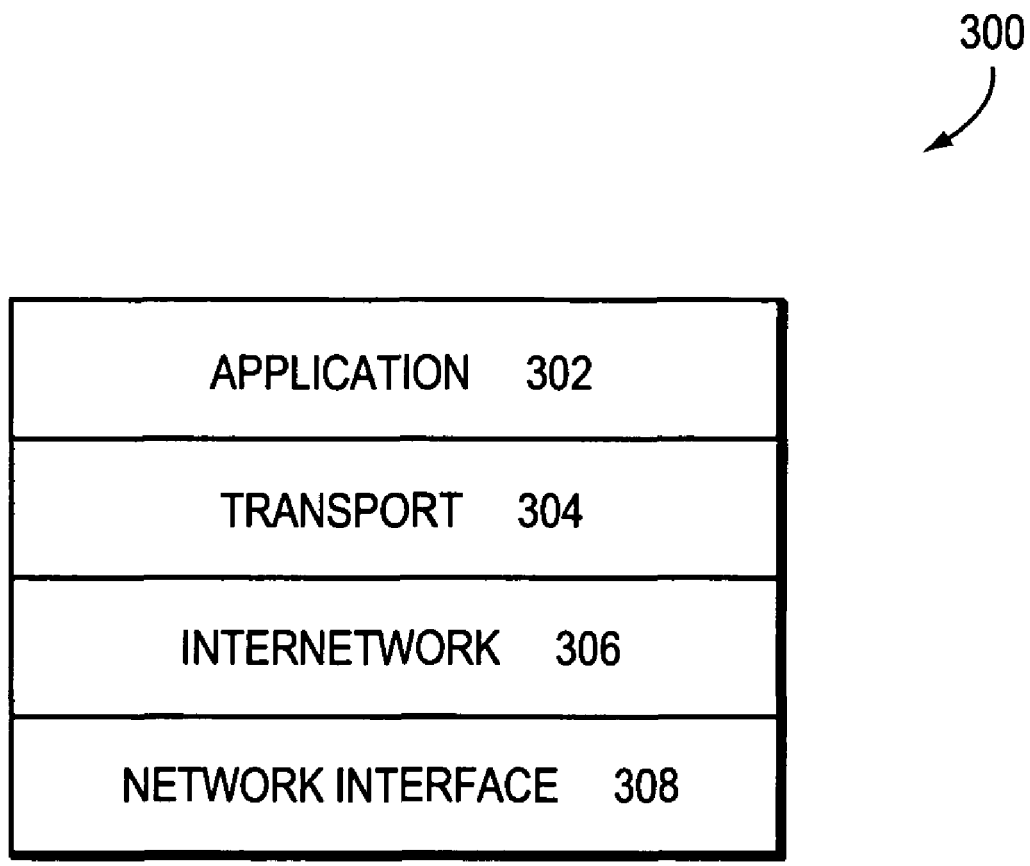
FIG. 3 is a schematic block diagram of a conventional protocol stack, such as the Internet communications protocol stack, within the router of FIG. 2.

A key function of the router 200 is determining one or more interfaces to which a packet is forwarded in the router; in order to accomplish such "routing" the routers cooperate to determine best paths through the computer network 100. The routing function is preferably performed by an internetwork layer of a conventional protocol stack within each router. FIG. 3 is a schematic block diagram of a conventional network protocol stack, such as the Internet communications protocol stack 300. The architecture of the Internet protocol stack is represented by four layers termed, in ascending interfacing order, the network interface layer 308, the internetwork layer 306, the transport layer 304 and the application layer 302.

The lower network interface layer 308 is generally standardized and implemented in hardware and firmware, whereas the higher layers are typically implemented in the form of software. The primary internetwork layer protocol of the Internet architecture is the IP protocol (IP). IP is primarily a connectionless protocol that provides for internetwork routing, fragmentation and assembly of exchanged packets— generally referred to as "datagrams" in an Internet environment—and which relies on transport protocols for end-to-end reliability and other service characteristics. An example of such a transport protocol is the TCP protocol, which is implemented by the transport layer 304 and provides connection-oriented, end-to-end reliability services to the upper layer protocols of the Internet architecture. The term TCP/IP is commonly used to denote the Internet architecture.

In particular, the internetwork layer 306 is concerned with how packets are forwarded through the network, although it is not directly concerned with how the MFIBs are calculated. A multicast routing protocol may be used to perform multicast routing (for the internetwork layer) through the computer network. Examples of multicast protocols that may be advantageously used with the present invention include the Protocol Independent Multicast-Sparse Mode (PIM-SM) and PIM source specific multicast (PIM-SSM) routing protocols, along with the Internet Group Membership Protocol (IGMP). These protocols are well know and described in detail in *Protocol Independent Multicast-Sparse Mode (PIM-SM): Protocol Specification (Revised)*, Internet Engineering Task Force Internet-Draft, draft-ietf-pim-sm-v2-new-09.txt, by Fenner et al. February 2004 and *Internet Group Management Protocol, Version 3, Request for Comments (RFC)* 3376, by Cain et al., October 2002, which are hereby incorporated by reference as though fully set forth herein.

PIM relies on an underlying topology-gathering protocol to populate a unicast routing table 425 (FIG. 4) of routing information base (RIB 420) with routes. As used herein, a route is a combination of a set of path attributes and a prefix. The RIB stores generalized route state for those unicast routes that are needed by unicast forwarding and PIM 430. For unicast routes of interest (e.g., unicast addresses appearing as source addresses in (S,G) multicast routes and rendezvous point addresses), PIM caches information in its PIM topology table 435. The cached information includes next-hop addresses, next-hop interfaces, connected flags (indicating whether the addresses are directly connected) and metrics.

The routes in the RIB table may be provided directly from a unicast routing table or by separate routing protocols, such as the Border Gateway Protocol version 4 (BGP4) and Multi-protocol extensions to BGP4 (MBGP). BGP4 is an interdomain routing protocol used to perform interdomain routing (for the internetwork layer) through the computer network. The routers 200 (hereinafter "neighbors") exchange routing and network layer reachability information (NLRI) among autonomous systems over a reliable transport layer connection, such as TCP. An adjacency is a relationship formed between selected neighbors for the purpose of exchanging routing messages and abstracting the network topology. The BGP4 routing protocol standard is well known and described in *Request For Comments (RFC)* 1771, by Y. Rekhter and T. Li (1995), which is hereby incorporated by reference.

BGP4 is generally capable of only carrying routing information for IPv4; accordingly, MBGP extends BGP4 to allow carrying of routing information for multiple network layer protocols, including IPv6 addresses. MBGP extends BGP4 to associate these network layer protocols with next hop information and NLRI, including NLRI for multicast forwarding. Address Family Identifiers (AFIs) and Subsequent Address Family Identifiers (SAFIs) are used to identify the network layer protocols and the type of NLRI. MBGP and AFI/SAFI Address Family are well known and described in *RFC* 2858, by T. Bates et al. (2000) and *RFC* 1700 by J. Reynolds et al (1994), which are hereby incorporated by reference.

Figure 4:
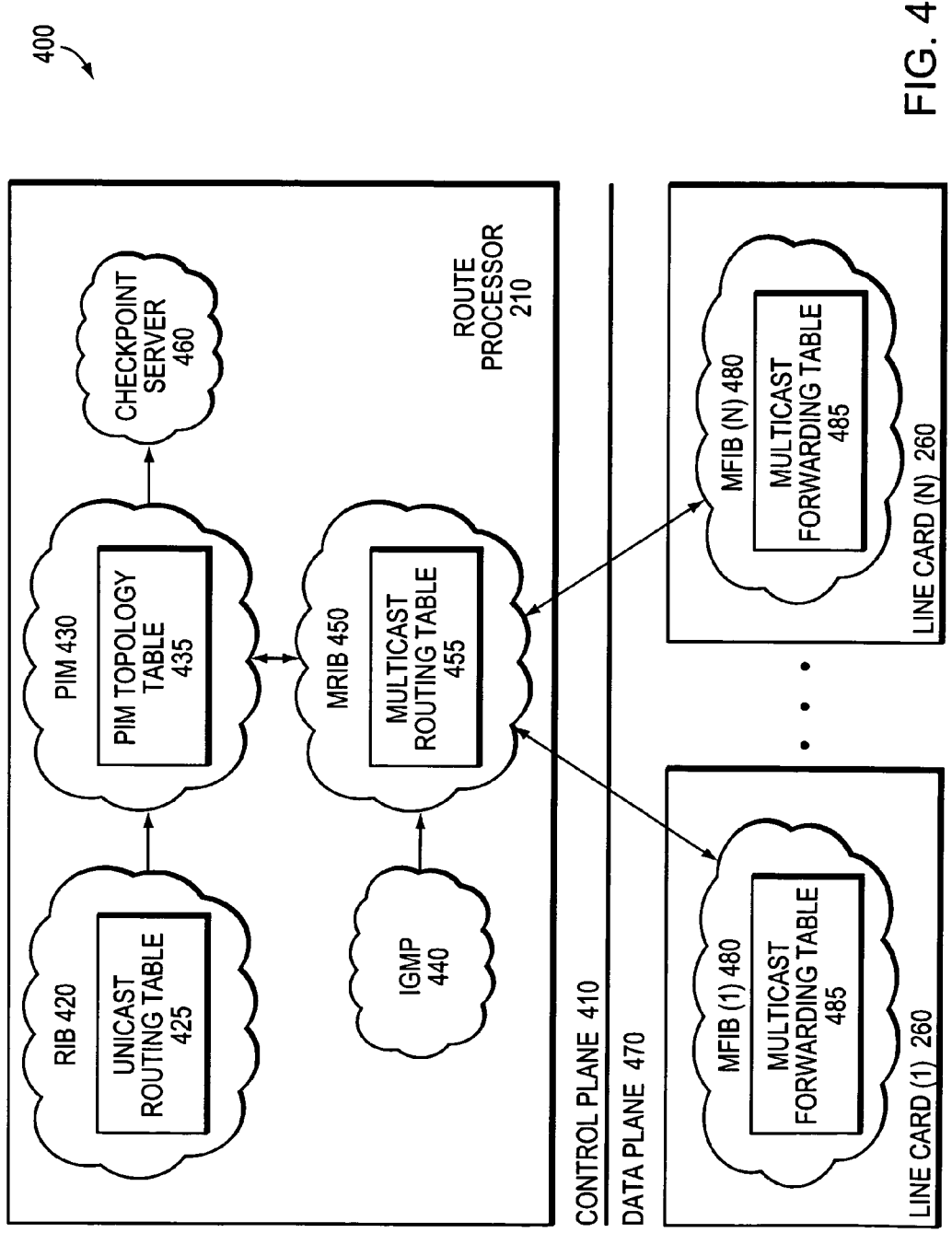
FIG. 4 is a schematic block diagram illustrating a functional non-stop forwarding (NSF) multicast infrastructure of the router of FIG. 2.

FIG. 4 is a schematic block diagram illustrating the functional infrastructure 400 of the router 200. The functional infrastructure 400 is preferably separated into a control plane 410 and a data plane 470, wherein separation is specified in terms of software components overlayed onto hardware elements, such as the route processors 210 and line cards 260. The data plane components/elements are configured to retrieve data packets from the network and provide those packets to forwarding logic of the router (and vice versa). In contrast, the control plane components/elements are used to manage/control traffic forwarding operations of the router. The infrastructure 400 allows the router to continue performing traffic forwarding operations throughout the data plane 470 in the presence of a failure and/or software restart within the control plane 410. In essence, the infrastructure enables the router 200 to function as a non-stop forwarding (NSF) capable router.

In the illustrative embodiment, the router operating system 232 implements multicast components as separate software processes that are individually restartable and distributed over active route processors 210 and line cards 260 which, in turn, are individually hot-swappable and may have redundant (standby) backups. To that end, the data plane multicast components include MFIBs 1-N 480 executing on the line cards, whereas the control plane multicast components include the RIB 420, PIM 430, IGMP 440, a multicast RIB (MRIB 450) and a checkpoint server 460 executing on the route processors 210. Operationally, the control plane of the router builds the MRIB 450 (and, more specifically, its multicast routing table 455) after exchanging routing information with the neighbors. For example, PIM provides MRIB with a chosen reverse path forwarding (RPF) address and interface for each route, which is used by the data plane to accept packets for forwarding through the router. The primary role of the MRIB 450 is to facilitate communication between the various multicast components, i.e., coordinate distribution of state between the protocol applications (e.g., PIM, IGMP, etc.) and between these protocols and MFIB. As a result, MRIB provides the next hop router information and a multicast-capable path to each multicast destination. The MFIB 480 is derived from the MRIB and is embodied as one or more multicast forwarding tables 485 that are populated on the line cards 260 and whose contents describe how to forward data packets through the router.

The present invention is directed to a multicast NSF router architecture that enhances high availability of the router 200. The NSF router architecture leverages the functional infrastructure 400 of the router to prevent hardware or software failures in the control plane 410 from significantly disrupting the function of the data plane 470, thereby preserving multicast data forwarding during control failures. To that end, the architecture enables hardware or software components to fail while other hardware or software components enter NSF mode to continue performing their functions with minimal impact. For example, if a route processor 210 is removed from the router 200, thus taking down the entire control plane 410, the connection between MFIB 480 and MRIB 450 is broken and MFIB 480 enters NSF mode. If a single component (e.g., PIM 430) fails but the rest of the control plane, including MRIB 450, remains operational, then the connection between MRIB 450 and PIM 430 is broken and MRIB 450 will send a message to MFIB 480 instructing it to enter NSF mode.

As described herein, various multicast components of the router cooperate to provide a checkpointing and recovery technique of the multicast NSF architecture that enables efficient restart and recovery of the control plane failures without loss of data connectivity. Recovery in the multicast NSF router involves efficient restarting of a failed multicast component, such as PIM, and rebuilding of state based on conventional PIM protocol messages until all necessary information has been recovered. In this context, rebuilding of state denotes reestablishing communication between the recovering PIM routing protocol and its peer routing protocols executing in neighbors, and exchanging multicast control messages among those protocols to enable reconstruction of the PIM topology table. The PIM topology table 435 is illustratively located in a portion of memory 230 belonging to PIM and, as such, is not persistent across failures to the routing protocol. Thus when PIM restarts after a failure, its topology table is empty. As a result, the novel multicast NSF technique monitors and persistently stores, i.e., checkpoints, selective information so that the information can be efficiently retrieved and used to rebuild the contents or state of the PIM topology table during NSF recovery.

I. Checkpointing Various Types of Information

One aspect of the invention pertains to the minimal amount of state that is check-pointed at the control plane 410 in order to implement the multicast NSF technique. As used herein, the term "checkpointing" denotes steady-state (i.e., proper operation of the router) monitoring and persistent storage of selective state of a software component, e.g., a multicast routing protocol. In particular, this aspect of the invention is directed to the definition of the type of information that is checkpointed, as well as the manner in which that information is stored. Checkpointing preferably occurs in an incremental fashion, i.e., incrementally building a backup storage of information needed by the protocol to efficiently recover after a failure. A set of databases are defined that comprises types of selective information used by the multicast protocol; these types of information are checkpointed because that information cannot be recovered fast enough through the network to enable effective multicast NSF functioning. The minimal set of multicast state is saved in a persistent location that is outside the bounds of the failure (e.g., the multicast protocol) and where the information can be efficiently retrieved during recovery.

In the illustrative embodiment, PIM is the multicast routing protocol that checkpoints the information/state databases. It should be noted that the checkpointing and recovery technique of present invention may apply to various implementations of NSF for PIM, such as NSF for PIM-SM, Bidirectional PIM (BIDIR-PIM) and PIM source specific multicast (PIM-SSM), collectively referred to herein as "PIM". The databases are illustratively stored in checkpoint tables within a portion of memory ("memory window") that is shared between two components, e.g., PIM 430 and checkpoint server 460. Storage of the multicast state databases in a shared memory window protects the databases from the failure of a multicast component (e.g., PIM) implementing NSF. Although the shared memory window is described in the illustrative embodiment, it should be noted that other persistent storage techniques and mechanisms may be used in accordance with the checkpointing aspect of the present invention.

Figure 5:
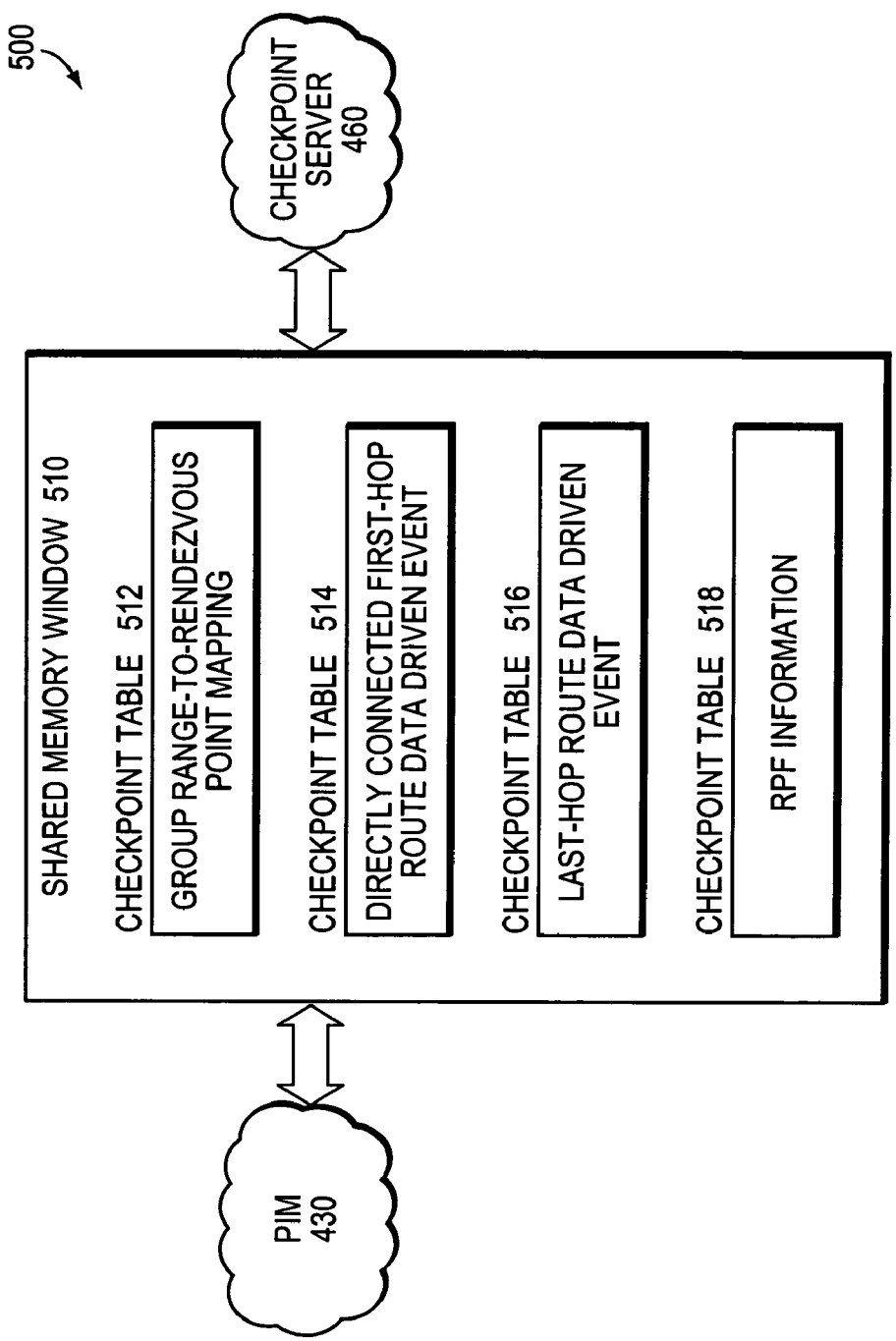
FIG. 5 is a schematic block diagram of an illustrative checkpointing arrangement according to the present invention.

FIG. 5 is a schematic block diagram of an illustrative checkpointing arrangement 500 according to the present invention. The shared memory window 510 is preferably a portion of memory 230 on an active route processor 210 that is outside of the memory belonging to PIM. PIM 430 enters the shared memory window 510 in order to load the selective information into checkpoint tables 512-518. When PIM fails, the checkpoint server 460 persistently maintains the stored information in the window 510 until PIM restarts. In addition, the checkpoint tables are periodically copied from the active route processor to its standby route processor so that the tables are available if the entire active route processor fails. Thus, the minimal set of multicast state is stored outside of any potential failure, including the multicast software component and/or the hardware element executing the component.

It should be noted that one alternative to selective information checkpointing is to checkpoint the entire contents of the PIM topology table 435. However, the topology table contents are quite volatile, i.e., they change constantly. For a large topology table, it may be impractical to save those volatile contents fast enough to keep up with the changes and still be able to perform other required protocol processing. Even if it were practical to do so, it would be expensive (both in time and space) to save the contents of such a large table because of the additional resources (e.g., memory) required. Another approach is to save none of the PIM topology table contents. Yet, in response to a control failure and subsequent restart of the control plane, the entire contents of the topology table would have to be reconstructed, causing excessive control plane and data events for the PIM-enabled routers. This, in turn, creates churn in the network, i.e., routers other than the one experiencing the failure will notice changes in multicast routing.

Thus, this aspect of the invention identifies the minimal amount information that requires checkpointing in order to recover without losing packets, without creating churn in the network and without checkpointing all contents of the topology table. By checkpointing the minimal types of information, PIM can reestablish its final state prior to failure without having to, e.g., recreate the sequence of previous data-driven events that established that final state. This aspect of the invention also minimizes the amount of control messages that must be exchanged with neighbors after recovery. That is, the invention eliminates the churn by enabling the router to go directly to its final state without going through all intermediate states that require cooperation of its neighbors in the network. In order to build that final state, the identity of the rendezvous point must be known.

a. Auto-RP Group-to-Rendezvous Point Mappings

According to the invention, one type of information that is checkpointed by PIM and stored in checkpoint table 512 is a mapping of group address (ranges)-to-rendezvous point addresses. Checkpointing of group range-to-rendezvous point address mapping is needed to ensure that the router 200 knows the identity of the rendezvous point for each multicast group of receivers that desires to receive messages destined for a multicast group address. As noted, Auto-RP and BSR are announcement protocols that continuously distribute mappings between group ranges and rendezvous points to PIM-enable routers in the computer network. PIM 430 illustratively checkpoints a group range (e.g., a multicast group address and a prefix) and a rendezvous point address (i.e., the unicast IP address of the rendezvous point) for every new (current) Auto-RP or BSR group mapping that it learns.

b. Data-Driven Events

Broadly stated, a unicast routing protocol exchanges control messages among its peers, builds a topology and populates a FIB that is used by the router to forward unicast data traffic through the router. Similarly, a multicast routing protocol exchanges control messages with its peers, builds multicast distribution trees and populates a MFIB (e.g., through the MRIB). However, the multicast routing protocol, such as PIM, does not build topology solely on the basis of control plane communication; rather, PIM requires information about packets received in the data plane to build the correct forwarding state, which MFIB uses to forward the packets. In other words, the router must often examine the data of the multicast packets it forwards and, further, must consider the arrival of a multicast packet on an interface as a control event that something "unusual" may be occurring in the network. The control event triggered by a data packet is referred to as a "data-driven" event.

A data-driven event is generally characterized by routing information stored in multicast forwarding entries of the MFIB. A multicast routing protocol populates an MFIB entry with information that specifies an ingress interface on which an incoming multicast packet should be accepted, as well as a set of egress interfaces over which the incoming packet should be forwarded. One or more control flags may be associated with each interface of the entry, wherein the control flags specify certain actions/behavior to be taken by the router in response to the reception of the incoming packet. Examples of control flags that may be advantageously used with the present invention are provided in U.S. patent application Ser. No. 10/376,006 titled Multicast-Routing-Protocol-Independent Realization of IP Multicast Forwarding, by I. Kouvelas et al, filed Feb. 28, 2003, which is hereby incorporated by reference as though fully set forth herein.

For example in response to receiving an incoming multicast packet, the router consults the MFIB to find an entry that matches the multicast destination address of the packet. The matching MFIB entry instructs the router as to which egress interfaces the packet should be forwarded. Typically, the multicast packet is accepted on a single ingress interface, i.e., the RPF interface that represents the shortest path to the source, and is forwarded out a set of egress interfaces to other destinations (routers) that have expressed interest in receiving the data traffic. In addition, the ingress interface for the matching entry may have one or more asserted control flags instructing the data plane to signal the control plane when the multicast packet is received at the router. The arrival of the multicast packet on that ingress interface is thus a data-driven event.

Data-driven events cause changes in state and control messages exchanged among a multicast routing protocol, such as PIM, executing on the router and its neighbors. In the illustrative multicast NSF router architecture, the data plane notifies the control plane of the data-driven event (via a control signal) and the control plane interprets that event in order to re-converge on the correct forwarding state. The MFIB 480 is the multicast component in the data plane 470 that notifies MRIB 450 in the control plane 410 of the data-driven event. MRIB then passes that notification to PIM 430, which uses the reception of multicast data packets that are to be forwarded by the router to infer portions of the current network topology used to forward the packets. The control signal received by PIM indicates that a data-driven event occurred for a particular source and group address of a multicast data packet that was received at a particular interface of the router. Reception of a multicast packet can thus be interpreted as an event signal to modify the contents of the MFIB.

It is thus clear that data-driven events do not constitute control state exchanged among neighbors, but rather comprise knowledge obtained by snooping data traffic passing through the data plane of the router. When recovering from a failure, the multicast control plane component (e.g., the PIM routing protocol) cannot obtain knowledge of multicast data packets previously snooped by the data plane from its peers routing protocols in the neighbors. Since it must reconstruct state without relying on the data plane, PIM records (checkpoints) the occurrence of these data-driven events so that the information is readily available during NSF recovery.

According to the invention, data-driven events comprise another type of information that is checkpointed by PIM 430. In response to receiving a control signal, PIM records a tuple of information comprising source, group and ingress interface as an entry of the appropriate checkpoint table 514-516. Although the tuple is recorded for each data-driven event reported by MFIB to the control plane, it should be noted that the MFIB does not generate a data-driven event on every multicast data packet that passes through the router. In fact, the majority of packets are forwarded through the router without generating an event. Yet if one or more control flags of an entry specify that an event has occurred, the MFIB generates a control signal and sends it to the control plane, where the occurrence of that event is recorded unless it has already been check-pointed.

In the illustrative embodiment, the data-driven events are further check-pointed into two categories, e.g., directly connected first-hop (S,G) routes and last-hop (S,G) SPT routes, for storage in separate tables 514-516. The last-hop SPT routes are signals indicating that construction of a shortest path tree (SPT) from the last-hop router to the source is completed and data is now flowing on that SPT branch. These data-driven events are interpreted by PIM completely in the context of the current PIM topology table, i.e., PIM 430 uses additional information held in the topology table 435 to determine the context and type of event. The various categories of data-driven events are stored in separate checkpoint tables primarily because of the sequence in which they are replayed. During NSF recovery, the checkpoint server 460 replays the data-driven event routes at slightly different times to coordinate their flow of information into the PIM topology table with other information received by PIM from other sources.

c. Reverse Path Forwarding (RPF) Information

In addition to Auto-RP and data-driven event signals, another type of information that is made available to PIM after restart is RPF information, e.g., addresses of previous-hop routers for sources and rendezvous points. The RPF information includes the identity of a previous-hop router, otherwise known as the RPF neighbor towards the source or rendezvous point. When a host wants to join the shortest path of a shared multicast distribution tree towards a source or rendezvous point, it needs to know the previous-hop router to which to send that join request. In unicast terminology, that router is referred to as the next-hop router, whereas in multicast terminology, it is the RPF neighbor. Thus, the unicast next-hop router is the multicast previous-hop router because the address of that router is no longer towards the destination of a unicast packet, but rather towards the source of a multicast packet.

Multicast routing protocols, such as PIM, obtain RPF information from the RIB control plane component. However, if there is a complete active route processor failure, the RIB 420 may be empty, e.g., for some time after restart. In the illustrative multicast NSF architecture, both unicast and multicast components failover from the active route processor to the standby route processor. In other words, unicast NSF is enabled for those unicast protocols which provide RPF information for multicast NSF. This prevents other routers in the network from detecting unicast routing changes, which causes them to reconverge around the failure and change their RPF information in routes, thereby increasing the potential for multicast loops. During recovery, PIM needs the RPF previous-hops for all of the sources and rendezvous points in order to rebuild the correct state of its topology table 435.

According to this aspect of the invention, minimal RPF state is made available for each source or rendezvous point address that appears in PIM topology table, i.e., the address of every source and rendezvous point, as well as their associated RPF information. RPF information generally comprises an interface and address of the previous-hop router towards some route which, in turn, may comprise the source of a session or the rendezvous point. In the illustrative embodiment, the RPF information comprises an interface, a unicast address of the previous-hop router and a unicast distance in metric; this information is made available to the control plane (PIM) through, e.g., checkpointing or other means, such as FIB lookups on a line card. As for the former, the RPF information is stored in checkpoint table 518 until the unicast routing protocols rebuild their state. Those protocols then inform PIM 430 that the unicast tables have converged and make the RPF information available to PIM via the RIB 420.

II. Recovery

According to another aspect of the inventive technique, NSF recovery comprises a plurality of phases having an associated timing sequence that efficiently restarts the router and its constituent multicast components after a control plane failure in order to obviate packet loss. A control plane failure may take the form of single or multiple multicast components failing due to software or hardware faults, thereby triggering multicast NSF in the router to preserve forwarding state. Planned maintenance, such as software upgrades or downgrades which require component restarts or failover affecting the route processor on which multicast protocols are running, will also trigger multicast NSF during the maintenance.

Broadly stated, the MFIB enters NSF mode during a MFIB freeze phase that "freezes" the contents of its forwarding table in response to a control plane failure, e.g., a failure to PIM, and subsequent communication disconnection between MFIB and PIM. Freezing of the MFIB preserves "stale" routes in the data plane, thereby ensuring continued multicast data flow through the router for pre-existing routes. PIM (and any other failed control plane component) then restart in NSF mode within a defined period of time during a process restart phase. In a checkpointed data recovery phase, PIM replays a first portion of the checkpointed information (e.g., group range-to-rendezvous point address mapping and RPF information) before entering a protocol adjacency reestablishment phase, where PIM (re)establishes control traffic communication (e.g., PIM hello adjacencies) with its peer routing protocols. As soon as the hello adjacencies are reestablished, PIM join/prune messages begin flowing between neighbors to rebuild state on the failing router and refresh state on the neighbors. Note that such control traffic communication continues throughout NSF recovery. The checkpointed data recovery phase is then reentered to replay the remaining portion of the information (e.g., data-driven events). In a MFIB refresh phase, the connection between MFIB and PIM (via MRIB) is reestablished and the contents of the MFIB forwarding table are updated. Thereafter, a NSF completion phase is entered wherein MFIB (and PIM) transition to normal mode, thereby completing NSF recovery.

Figure 6A:
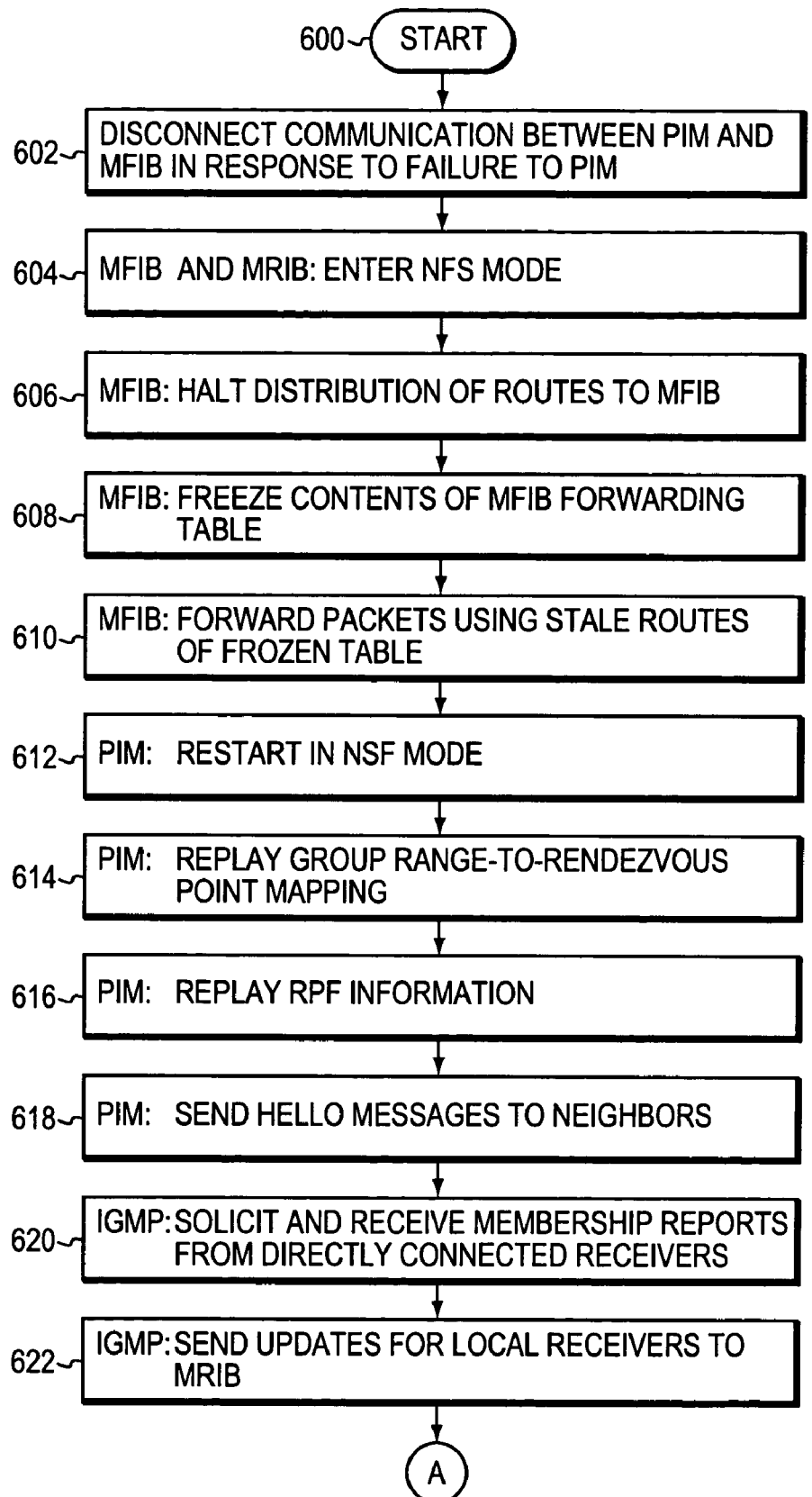
FIGS. 6A-6C are flowcharts illustrating a sequence of steps for implementing NSF recovery according to the present invention.
Figure 6B:
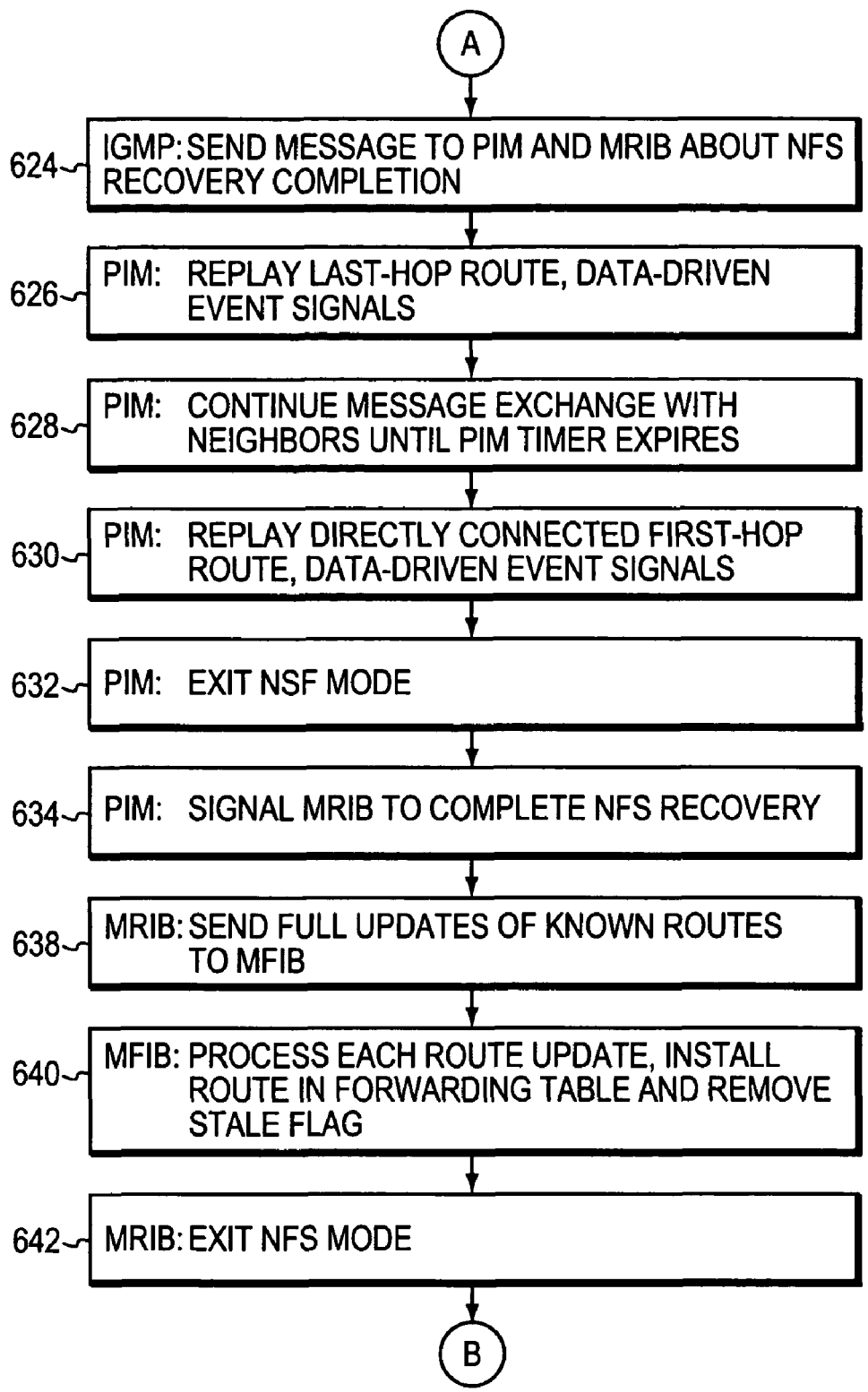
Figure 6C:
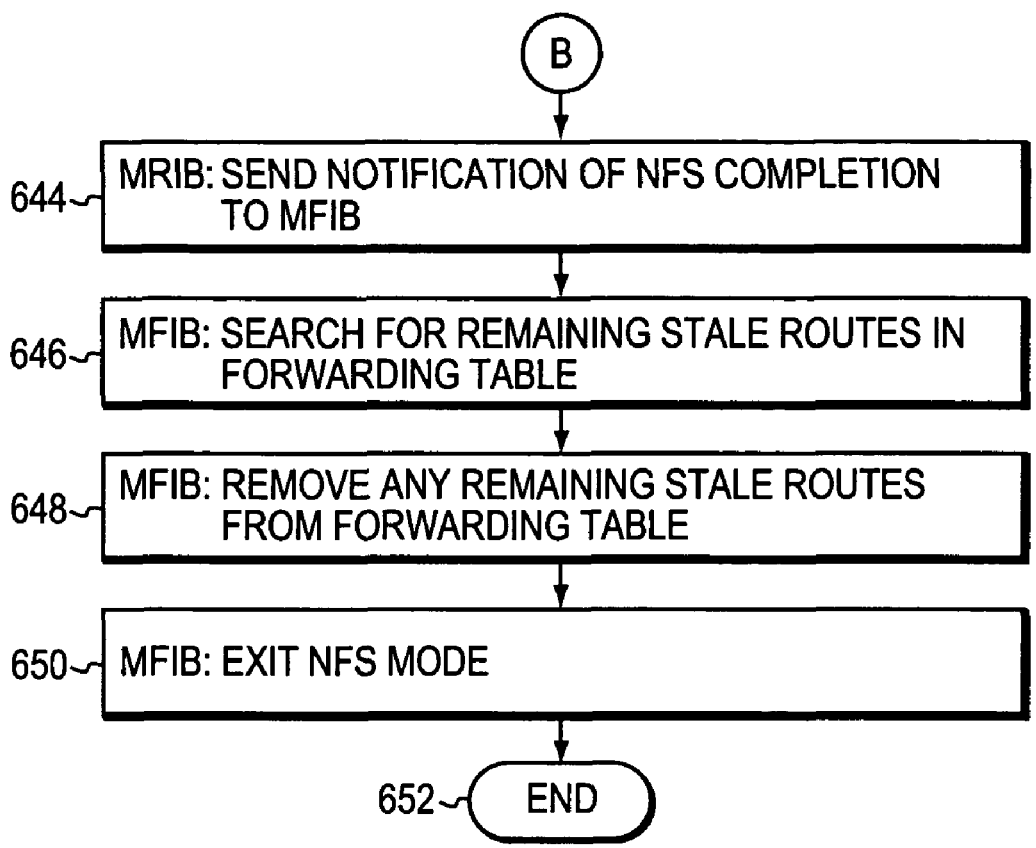

FIGS. 6A-6C are flowcharts illustrating a sequence of steps for implementing NSF recovery according to the present invention. The sequence starts at Step 600 and proceeds to Step 602 where a control plane failure to a multicast component, e.g., PIM, results in a communication disconnection between MFIB and PIM. Note that the MFIB may either detect the disconnection itself or be informed of the disconnection by MRIB. In response to the failure, both MFIB and MRIB enter NSF mode in Step 604. In Step 606, MRIB halts distribution of route updates to MFIB and, in Step 608, MFIB "freezes" the contents of its forwarding table, i.e., all routes in the MFIB forwarding table are marked "stale". Note that, upon entering NSF mode, a timer for MRIB is set (e.g., 180 seconds by default).

As noted, freezing of the MFIB preserves the stale routes in the data plane, thereby ensuring that multicast packets continue to flow through the router for pre-existing routes. Accordingly, in Step 610, the MFIB continues to forward data packets through the router using those stale routes. In Step 612, the failed component (such as PIM and/or IGMP) restarts in NSF mode either on the same active route processor or on a standby route processor. Illustratively, restart of PIM and/or IGMP must happen within a certain period of time (e.g., 30 seconds). Each component must restart within that time so that it can begin communicating with its neighbors before those neighbors time out any information about the component.

As further noted, PIM checkpoints several types of information during steady-state operation, including Auto-RP group range-to-rendezvous point address mappings, RPF next-hop information and data-driven event signaled states. PIM 430 cooperates with the checkpoint server 460 to reload (replay) the selective information from each checkpoint table stored in the persistent shared memory window 510 at a different point in the NSF recovery sequence. Protocol processing, including the replay procedure, is performed by a single thread within in PIM, so table replay occurs sequentially. Specifically as part of its initialization procedure and before processing any external events, PIM replays the group range-to-rendezvous point address mapping information discovered from Auto-RP (Step 614). Replay of the contents of this checkpoint table 512 occurs as soon as the PIM restarts so that any updates, e.g., join/prune messages, received from neighbors can be used by PIM to begin immediately rebuilding state. In Step 616, PIM replays the RPF information state from the checkpoint table 518.

Thereafter, PIM begins sending PIM Hello messages on all active interfaces to reestablish adjacencies with its peer protocols in the neighbors (Step 618). For multicast NSF to succeed, these messages must be received by the neighbors before their PIM Hello timeouts expire, e.g., 105 seconds after receipt of the last Hello. An option (e.g., generation ID) of the Hello message notifies the neighbors that PIM has restarted. In response, the neighbors immediately send contents (e.g., join/prune state) of their topology tables to PIM. By promptly reestablishing PIM Hello adjacencies and control traffic, state can be repopulated in the multicast protocols (such as PIM and IGMP) without neighbors detecting a fatal problem and routing around the router 200. Since the multicast NSF router architecture attempts to recover normal protocol processing and state before the neighbors "time out" the PIM Hello neighbor adjacency, the novel technique does not require changes in the multicast routing protocols and may be implemented on any subset of routers in a network.

When restarting in NSF mode, either along with PIM or in response to notification by MRIB of NSF recovery, IGMP 440 has a period of time (e.g., 60 seconds) during which it also recovers state. In Step 620, IGMP solicits and receives membership reports from all of its directly connected receivers during this period. After the period of time, IGMP will have received the complete and current membership state and, in Step 622, sends updates to the MRIB for all local receivers. In Step 624, IGMP sends a message to PIM (via MRIB), notifying those components that its NSF recovery period is finished. By the time it receives that message, PIM has populated its topology table 435 with last-hop route signal information derived from IGMP. Since IGMP is a last-hop protocol, the last-hop route signals are relevant to routes for which the multicast router 200 is the last-hop to its directly connected receivers. Once all of the last-hop information is received from IGMP, PIM knows which receivers had connected to the router prior to the failure and can replay the data signals that are relevant to those routes. Thus, in Step 626, PIM replays the last-hop (S,G) SPT route data signals from checkpoint table 516, thereby creating the final, correct last-hop state for these routes.

In Step 628, NSF recovery continues with message exchanges among PIM neighbors until a PIM timer expires (e.g., 120 seconds by default), which signals the end of the period of time needed to receive information from the neighbors. Essentially, PIM operates normally during this time, receiving join/prune messages from its neighbors, and updates from MRIB. In response to expiration of the timer, PIM starts the final phase of its recovery, which includes replay of the directly connected first-hop (S,G) routes from checkpoint table 514 (Step 630). These directly connected first-hop signals are relevant to routes for which the multicast router 200 is the first-hop to a directly connected source. Upon replay of the first-hop signals, PIM exits NSF mode (Step 632) and signals MRIB to complete its NSF recovery (Step 634).

Note that if the PIM topology table 435 was not lost during the failure (e.g. only MRIB failed), PIM 430 signals its recovery after both (i) connecting to and fully updating the MRIB 450, and (ii) receiving notification that IGMP 440 is recovered. If the PIM topology table was lost, however, PIM will timeout its NSF mode after the 120 second timer expiration. Note also that during MRIB's timer period, protocol route updates and notifications of successful NSF recovery are redistributed normally between control plane components, which cooperatively rebuild MRIB's routing table 455. When the MRIB timer expires (or after the multicast control plane components have exited NSF mode, whichever comes first) MRIB resumes its normal operation, updating the MFIBs with any fresh routes in its table/database.

For example in response to receiving notification that PIM has completed its NSF recovery, MRIB sends full updates of all known routes to MFIB (Step 638). In Step 640, MFIB processes each route update, installs the updated route into its forwarding table and removes the stale flag on the updated route. After sending the full set of route updates to the MFIB, MRIB exits NSF mode (Step 642) and sends notification of NSF completion in the control plane to MFIB (Step 644). In response, MFIB scans its forwarding table, searching for any remaining routes that are marked stale (Step 646) and, upon discovering such routes, removes them from the table in Step 648. MFIB then exits NSF mode in Step 650. Note that if the notification signal is not received by MFIB after a predefined timeout period (e.g., 15 minutes from commencement of NSF mode), thereby indicating total control plane failure, MFIB will remove the stale routes and resume normal operation on routes, if any, that have been refreshed by MRIB. The NSF recovery sequence then ends at Step 652.

Advantageously, the present invention obviates the need to modify conventional multicast routing protocols and may be implemented on any subset of routers in a network. That is, the novel NSF checkpointing and recovery technique ensures that state can be rebuilt in the multicast routing protocol topology table before neighbors detect a fatal problem and time out multicast adjacency and route state, thereby leading to loss of multicast connectivity. In addition, multicast forwarding state is not modified or removed until routing protocols of the router are fully recovered and resynchronized with the neighbors. The present invention is distinguished from previous NSF solutions because it protects multicast data transfers, rather than unicast data transfers by coordinating recovery among various multicast components.

The foregoing description has been directed to specific embodiments of this invention. It will be apparent, however, that other variations and modifications may be made to the described embodiments, with the attainment of some or all of their advantages. For instance, it is expressly contemplated that the teachings of this invention, including the various multicast components described herein, can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A system configured to preserve multicast data forwarding during non-stop forwarding (NSF) recovery from a failure in a control plane of a multicast router within in a computer network, the system comprising:
   a first multicast component configured to checkpoint selective multicast state information from the control plane during proper operation of the router for subsequent retrieval and use when rebuilding contents of a topology table of the control plane during NSF recovery; and
   one or more second multicast components configured to cooperate with the first multicast component to replay the checkpointed selective multicast state information back to the control plane as part of a NSF recovery technique that enables efficient restart and recovery of the control plane failure without loss of data connectivity by the router in the network,
   wherein the checkpointed selective multicast state information comprises data driven event information that cause changes in state and control messages exchanged between the router and its neighbors in the network.

2. The system of claim 1 wherein the first multicast component is a multicast routing protocol executing in the control plane of the router.

3. The system of claim 2 wherein the multicast routing protocol is a protocol independent multicast (PIM) routing protocol.

4. The system of claim 3 wherein the topology table is a PIM topology table.

5. The system of claim 1 wherein the checkpointed selective multicast state information comprises group range-to-rendezvous point address mapping information that provides an identity of a rendezvous point for each multicast group of receivers that desires to receive messages destined for a multicast group address.

6. The system of claim 1 wherein the checkpointed selective multicast state information comprises reverse path forwarding information that specifies addresses of previous-hop routers for sources and rendezvous points in the network.

7. The system of claim 1 wherein the first multicast component is a protocol independent multicast (PIM) routing protocol executing in the control plane of the router and wherein the one or more second multicast components is a multicast forwarding information base (MFIB) executing in a data plane of the router.

8. The system of claim 7 wherein the NSF recovery comprises a plurality of phases having an associated timing sequence.

9. The system of claim 8 wherein a first phase of NSF recovery comprises a MFIB freeze phase that transitions MFIB into NSF mode and freezes contents of a MFIB forwarding table to preserve stale routes in the data plane, thereby ensuring continued multicast data flow through the router for pre-existing routes.

10. The system of claim 9 wherein a second phase of NSF recovery comprises a process restart phase that restarts failed control plane components in NSF mode within a defined period of time.

11. The system of claim 10 wherein the failed control plane component is the PIM routing protocol.

12. The system of claim 11 wherein a third phase of NSF recovery comprises a checkpointed data recovery phase that replays a first portion of the checkpointed selective multicast state information.

13. The system of claim 12 wherein the first portion of the checkpointed selective multicast state information comprises group range-to rendezvous point address mapping and reverse path forwarding information.

14. The system of claim 12 wherein a fourth phase of NSF recovery comprises a protocol adjacency reestablishment phase that establishes control traffic communication with peer routing protocols in neighboring routers of the computer network before returning to the third phase to replay a remaining portion of the checkpointed selective multicast state information.

15. The system of claim 14 wherein the remaining portion of the checkpointed selective multicast state information comprises data-driven event signals.

16. The system of claim 14 wherein a fifth phase of NSF recovery comprises a MFIB refresh phase that establishes a communication connection between MFIB and PIM and that updates the contents of the MFIB forwarding table.

17. The system of claim 16 wherein a sixth phase of NSF recovery comprises a NSF completion phase that transitions MFIB and PIM to normal mode, thereby completing NSF recovery.

18. A method for preserving multicast data forwarding during non-stop forwarding (NSF) recovery from a failure in a control plane of a multicast router within in a computer network, the method comprising the steps of:
checkpointing selective multicast state information from the control plane during proper operation of the router for subsequent retrieval and use when rebuilding contents of a topology table of the control plane during NSF recovery; and
restarting of a failed multicast control plane component in accordance with a NSF recovery technique that replays the checkpointed selective multicast state information back to the control plane to enable efficient recovery of the control plane failure without loss of data connectivity by the router in the network,
wherein the checkpointed selective multicast state information comprises group range-to-rendezvous point address mapping information that provides an identity of a rendezvous point for each multicast group of receivers that desires to receive messages destined for a multicast group address.

19. The method of claim 18 wherein the step of restarting comprises the step of providing a plurality of NSF recovery phases having associated timing sequences.

20. Apparatus configured to preserve multicast data forwarding during non-stop forwarding (NSF) recovery from a failure in a control plane of a multicast router within in a computer network, the apparatus comprising:
means for checkpointing multicast state selective information from the control plane during proper operation of the router for subsequent retrieval and use when rebuilding contents of a topology table of the control plane during NSF recovery; and
means for restarting of a failed multicast control plane component in accordance with a NSF recovery technique that replays the checkpointed selective multicast state information back to the control plane to enable efficient recovery of the control plane failure without loss of data connectivity by the router in the network,
wherein the checkpointed selective multicast state information comprises reverse path forwarding information that specifies addresses of previous-hop routers for sources and rendezvous points in the network.

21. A non-transitory computer readable medium containing executable program instructions for preserving multicast data forwarding during non-stop forwarding (NSF) recovery from a failure in a control plane of a multicast router within in a computer network, the executable program instructions comprising program instructions for:
checkpointing selective multicast state information from the control plane during proper operation of the router for subsequent retrieval and use when rebuilding contents of a topology table of the control plane during NSF recovery; and
restarting of a failed multicast control plane component in accordance with a NSF recovery technique that replays the checkpointed selective multicast state information back to the control plane to enable efficient recovery of the control plane failure without loss of data connectivity by the router in the network,
wherein the checkpointed selective multicast state information comprises data driven event information that causes changes in state and control messages exchanged between the router and its neighbors in the network.

22. An apparatus comprising:
a network interface;
a memory configured to store a shared memory window; and
a route processor configured to execute a checkpoint server, the checkpoint server to incrementally checkpoint multicast state information from memory belonging to a multicast component during proper operation of a control plane of the apparatus, and to store the checkpointed multicast state information in the shared memory window,
the processor further configured to, in response to a failure of at least a portion of the control plane, restart the control plane and replay the checkpointed multicast state information from the shared memory back to the control plane as part of a recovery operation that maintains data connectivity to one or more other network devices coupled to the network interface while the control plane is restarted and recovered, wherein the checkpointed multicast state information comprises group range-to-rendezvous point address mapping information that identifies a rendezvous point for each multicast group of receivers that desires to receive messages destined for a multicast group address.

23. The apparatus of claim 22 wherein the checkpoint server is configured to obtain the multicast state information from a Protocol Independent Multicast (PIM) topology table.

24. The apparatus of claim 22 wherein the checkpointed multicast state information comprises data-driven event information that causes changes in state and control messages exchanged between the router and its neighbors in the network.

25. The apparatus of claim 22 wherein the checkpointed multicast state information comprises reverse path forwarding information that specifies addresses of previous-hop routers for sources and rendezvous points in the network.

26. The apparatus of claim 22 wherein the processor is further configured to replay the checkpointed multicast state information from the shared memory window back to the control plane in a plurality of portions, the processor to replay a first portion of the checkpointed multicast state information before entering a protocol adjacency reestablishment phase, and to replay a second portion of the checkpointed multicast state information after entering the protocol adjacency reestablishment phase.

\* \* \* \* \*